United States Patent [19]

Hart

[11] 3,905,692
[45] Sept. 16, 1975

[54] PROCESS AND APPARATUS FOR PRODUCING ANIMATED FILMS

[76] Inventor: Kelly Hart, 8363 Trenton Rd., Forestville, Calif. 95436

[22] Filed: Feb. 12, 1973

[21] Appl. No.: 331,956

[52] U.S. Cl. .................... 352/52; 352/50; 352/87
[51] Int. Cl.² .......................................... G03B 21/32
[58] Field of Search ........ 352/50, 52, 87; 15/236 R; 353/24

[56] References Cited
UNITED STATES PATENTS

| | | | |
|---|---|---|---|
| 2,206,765 | 7/1940 | Crockwell | 352/52 |
| 2,529,664 | 11/1950 | Roysher | 353/24 |
| 3,036,190 | 7/1962 | Johnson | 15/236 R |
| 3,586,426 | 6/1971 | Bras | 352/87 |

Primary Examiner—Samuel S. Matthews
Assistant Examiner—Russell E. Adams, Jr.
Attorney, Agent, or Firm—Alfons Puishes

[57] ABSTRACT

A process and apparatus for producing animated films for motion picture or video tape application provides for drawing, painting, or sketching upon a sheet of heated glass against a light source from the opposite side while photographing from above. Utilizing suitable grease pencils which remain fluid at the temperature of the glass, together with suitable brushes, successive positions of an object may be drawn, partially erased, redrawn in another position, or altered otherwise while being photographed to give the animated effect. A novel machine construction makes the process rapid, convenient, and efficient.

10 Claims, 4 Drawing Figures

3,905,692

PROCESS AND APPARATUS FOR PRODUCING ANIMATED FILMS

BACKGROUND OF THE INVENTION

The art of producing animated films is at least as old as the art of motion pictures itself. It generally comprises methods and devices whereby drawings or sketches of objects or scenes are made by various techniques, photographed, and then reproduced by a projector to give the effect of live, moving, objects or persons.

It is probably most widely applied in the case of cartoons where a certain character is depicted by drawing it in a series of successive positions as it goes through a certain motion, photographing these, and processing for reproduction by a motion picture projector. It is obvious that in this procedure it is necessary to make a tremendous number of individual drawings, sketches or cartoons in order to produce the desired effect. Consequently, many processes and devices have been developed to reduce the cost by decreasing the number of actual sketches which are required.

One method in particular is involved with the use of so-called "cut-outs" in which flexible or hinged models of the character are made. The various elements such as heads, eyes, legs, arms, tail, etc., are actuated by a series of cords manipulated either by hand or automatically while being photographed in various positions against a moving background. Such an apparatus is described in the patent to Barnes, Jr. U.S. Pat. No. 3,288,548.

Another method comprises the steps of drawing the first position of the object, then transmitting photographically to the second position only that part of the object which remains stationary and drawing in only that part which has moved.

Such a method is covered by the patent of Blattner, U.S. Pat. No. 3,350,458.

Some methods use the effect of shadows created by different lighting effects to produce the illusion of movement or animation as does Disney in U.S. Pat. No. 2,201,689.

A very common method is to make the multiplicity of drawings required on sheets of transparent, cellulose acetate which are known in the trade as "cells," superimposing these transparent sheets as required to obtain the different positions and then photographing them. This is taught by Kroner in U.S. Pat. No. 2,149,779.

Stroboscopic and stereoscopic methods as taught by Whitney in U.S. Pat. No. 3,329,476 and Licitis, et al, U.S. Pat. No. 3,592,536 are also employed. Methods in which the painting medium itself, that is the ink or the paint is caused to move or flow while being photographed have also been used. One such technique is a method in which liquid paint is directed to flow across a smooth white or colored background by means of an air jet or stream while being photographed. The same effect may be produced by sandwiching a colored fluid or paint between two transparent sheets and moving the latter mechanically while photographing. These techniques are described in a publication entitled "How to Make Animated Movies" by Anthony Kinsey. A related technique is to make the drawings on a transparent sheet by means of a usual brush, photographing, dissolving, and making successive drawings and continuing to photograph. This technique and similar ones are described in a publication entitled "Animated Film: Concepts, Methods, Uses" by Roy Madsen.

The latter mentioned techniques are particularly adaptable to what is known as the "pastel technique" developed by McLaren and described also in the above work. These are particularly well suited for landscapes, cloud formations, and similar mass movement.

A particularly noteworthy method is that taught by Cockwell in his U.S. Pat. No. 2,206,765. He paints his objects on the bottom of a transparent sheet of material using what he calls a "slow-drying" paint and photographing through the opposite side of the sheet. While the paint is still in a plastic condition he manipulates it to produce different stages of movement of his objects while photographing them.

The foregoing background is by no means complete but is offered as a summary since the many other methods and devices which have been devised are in general extensions, variations, and modifications of the above general types.

I have found that none of the types heretofore developed have solved the basic problem of producing animated film of high quality, economically. All the previous methods require a substantial amount of drawing and redrawing even though somewhat reduced from the initial methods. Those which do not require a great deal of drawing and redrawing fail to give a pleasing and accurate reproduction of the motion of the objects. Some, of course, are limited to very narrow applications. Cockwell, mentioned above, overcomes some of the problems, but is still cumbersome, lacking in flexibility, and presents quite a difficulty to the operator in drawing on the back of a piece of glass while viewing it from the other side, a sort of "upside down" technique.

SUMMARY OF THE INVENTION

I have discovered that by using the process and apparatus of my invention I am able to satisfactorily overcome the objections to existing methods and devices and have thus made a break-through in this art. I produce my animated motion picture film or video tape by painting with grease pencils and brushes directly upon a hot glass surface placed over evently diffused light projecting from below and photographing with a camera from above. The glass upon which I do my painting is kept at an even temperature by the combined heating effect of the light source and a controlled electrical heat source. I employ special grease which remains fluid at a relatively low temperature, say approximately 170 degrees Fahrenheit, and maintain my glass surface at approximately this temperature while at work. I am able to remove portions of my drawing as it progresses easily with wiping cloths, paper towels or scrapers and proceed to make the further reproductions of my object or characters. I may also produce fine details by utilizing a blunt scriber against the surface of the glass and across the fluid medium.

While performing the above operations I operate a suitably located camera above the glass by means of a foot control system thus effecting excellent synchronization between my painting or sketching and the photographing and consequently obtain a very smooth motion effect for my animation.

The apparatus of my invention embodies a novel construction and arrangement of components. This provides not only for proper illumination and heating of my glass and photographing the work but also for rapid and convenient movement of my work horizontally, vertically, and through any desired angle and for corresponding adjustment of the camera to insure proper photographing and provide zoom effects. My apparatus is further constructed for rapid assembly, disassembly, and cleaning as desired.

DESCRIPTION OF PREFERRED EMBODIMENTS

Figure 1:
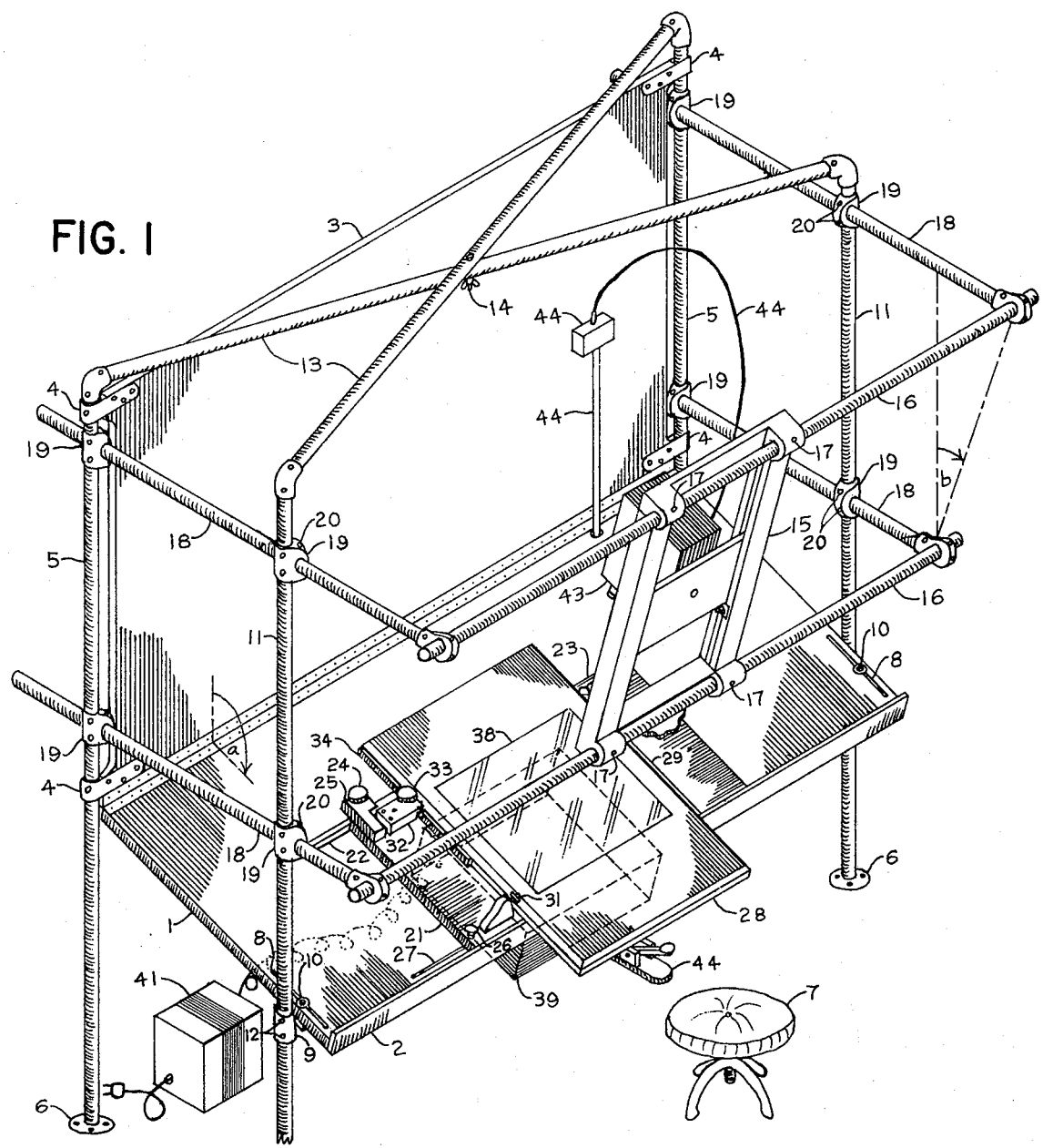
FIG. 1 is an isometric view of the complete assembly of the apparatus of my invention.

Referring first more particularly to FIG. 1 there is seen the work table 1, having a longitudinal raised edge or lip 2. Table 1 is hinged to backboard 3 so as to supply a variable angle alpha between the two, as described below. The backboard 3 is supported by means of backboard clamps 4 to a pair of rear vertical stanchions 5. The latter are supported from the floor by means of floor flanges 6.

A stool for the operator is shown at 7, the function of which will become clear from a description of the operation given below.

Located on opposite ends of work table 1 are adjusting slots 8, sliding table clamps 9 and adjusting bolts 10. Table clamps 9 ride on front vertical stanchions 11 to which they may be secured by lock bolts 12. The combined operation of these last elements facilitate setting table A at the predetermined angle alpha.

Rigidity of the structure is obtained by means of cross bars 13 and cross bar lock nut 14 as shown.

Camera support carriage 15 is supported on guide rails 16 and fastened in any desired position by means of lock screws 17. Camera support carriage 15 is shown in greater detail on FIG. 3 to which reference will be had later.

Figure 2:
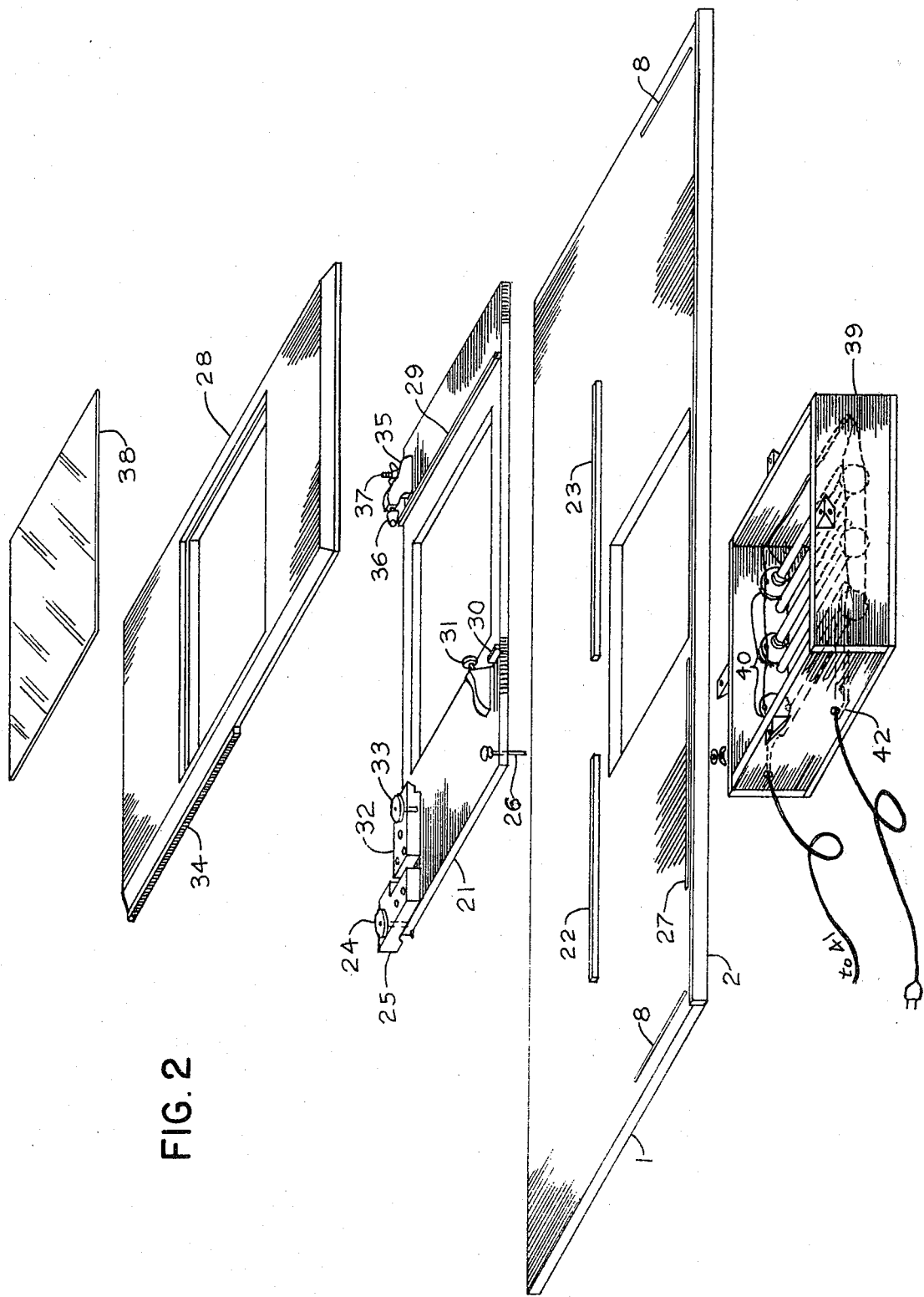
FIG. 2 is an exploded view of the easel assembly of my apparatus.

Lateral horizontal bars 18 ride through horizontal bar clamps 19 to which they are fastened in any desirable position by means of lock bolts 20. This latter combination of elements permits adjusting the camera support carriage 15 at any desired predetermined angle beta as shown. It is evident that for any given operating condition the camera 43 referred to more particularly below, must be perpendicular to the surface of table 1 and consequently the angle alpha must equal the angle beta plus 90° or conversely alpha minus beta must equal 90°. These adjustments are made for the convenience of the operator who is seated on stool 7, also described more fully below. Reference should be had now also to FIG. 2 which shows also work table 1 with its lip 2. Positioned upon work table 1 so that it rides against lip 2 is easel frame 21.

Movement of easel frame 21 in a left and right direction is aided by rack 22 and guide 23, also positioned on work table 1. Pinion 24 engages with rack 22 and is supported on frame 21 by support block 25. Lock bolt 26 engages with slot 27 in table top 1 so that frame 21 may be located in any desired left and right position.

Glass frame 28 is positioned upon easel frame 21 and rides in a back and forth direction between guides 29 and 30. This backward and forward motion is imparted by the combined action of rotating friction wheel 31, pinion 33, and rack 34. Pinion 33 is mounted on block 32 supported on easel frame 21 and rack 34 is positioned on the longitudinal edge of glass frame 28. The backward and forward motion of glass frame 28 upon easel frame 21 is controlled by the combined action of swivel or sliding block 35 mounted on the edge of easel frame 21 which permits pressure to be applied horizontally to glass frame 28 through the combined action of roller or wheel 36 and wing nut 37.

Blocks 25 and 32 described above are so mounted as to insure proper alignment and operation of all the moving parts described.

A piece of white opal glass 38, the function of which will be more fully described below, is positioned in the opening in frame 28 as shown. The opening in frame 28 coincides with the opening in frame 21 to insure proper transmission of light and heat to the under surface of opal glass 38, also as described more fully below.

A light box having a perimeter also coinciding with that of glass 38 is fixedly positioned underneath table 1 in a hole provided for this purpose as shown. Light box 39 is completely encased and insulated so that all the light and heat generated within it is transmitted directly and only to glass 38.

Positioned within light box 39 are heat generating light tubes 40 connected to an electrical supply source through a voltage regulator 41. When additional heat is required this is obtained from heating elements 42, also located within box 39.

I have found that six 40 watt incandescent display tubes having a length of one foot each spaced uniformally within box 39 and connected to a 120 volt alternating current supply source through a 250 watt voltage regulator to be satisfactory for some operations, but in other cases I may intermittently employ an augmented source of heat through the heating elements 42 which may be switched on and off manually as the operation requires. I may utilize automatic temperature control where desired but this is not essential to the successful operation of my invention. I may also use various other improved methods of supplying light such as lining my box 39 with aluminum foil or I may use a quartz-halogen light source or other types which maintain constant color temperature with use. I may also utilize a ventilating system in the event it is desirable to dissipate excessive heat.

A camera 43, which may be any standard or conventional motion picture camera or video tape recorder (equipped with a single frame mechanism), is equipped with a foot pedal control system 44 positioned so as to be accessible to the operator seated on stool 7.

Figure 3:
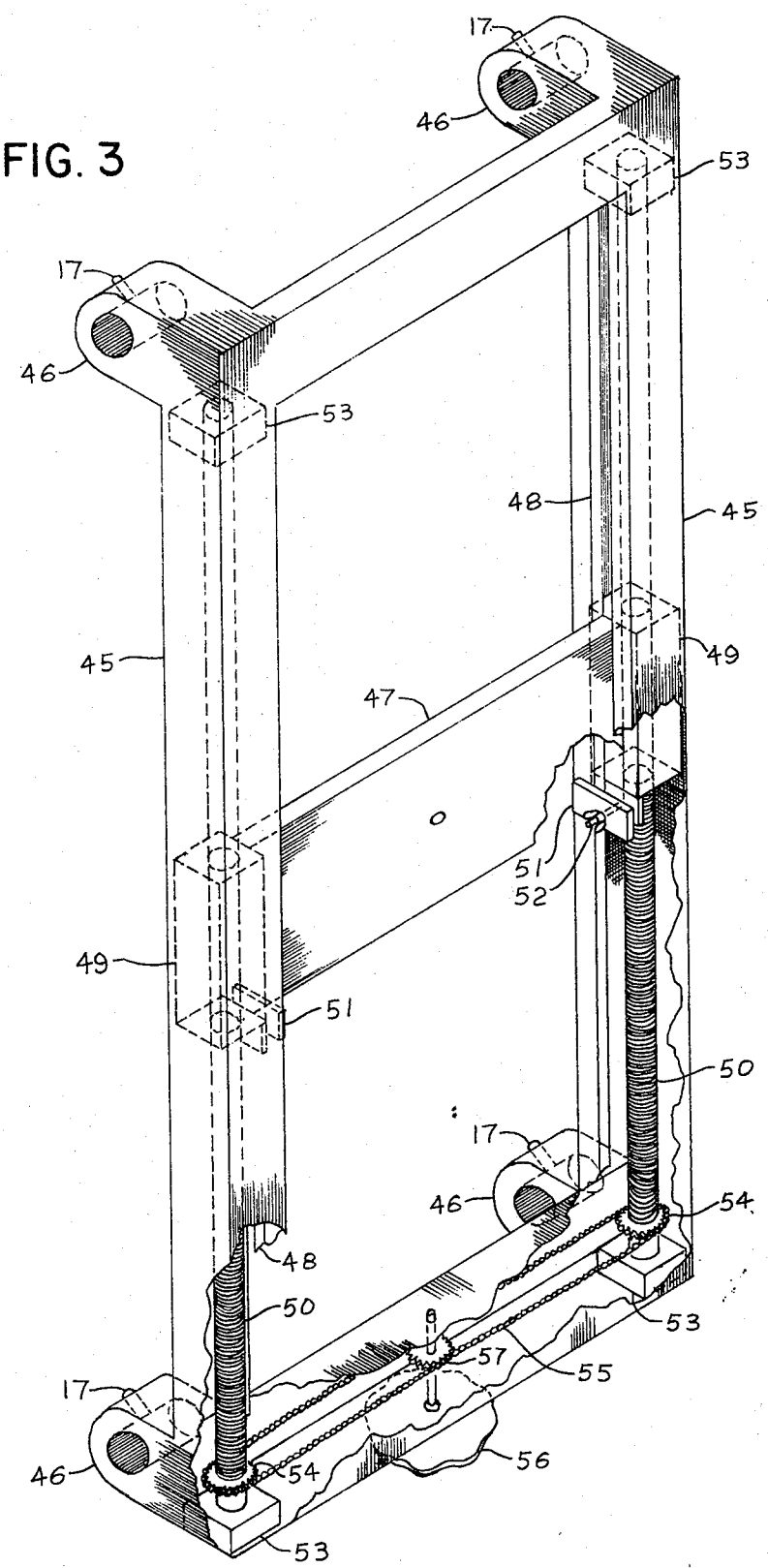
FIG. 3 is an isometric view of the camera support carriage.

Reference should now be had to FIG. 3 which shows the detail of the camera support carriage. Vertical tracks 45 are supported by sliding mounts 46 equipped with lock screws 17 which have been described previously and are seen on FIG. 1. Camera mounting plate 47 is arranged for traveling in guides 48 with the aid of traveling threaded blocks 49. Threaded blocks 49 are engaged by rotating lead screws 50. Clamps 51 equipped with wing nuts 52 serve to hold camera mounting plate in any desired position. Lead screws 50 rotate in bearings 53. Rotation is supplied to lead screws 50 by sprockets 54 which engage chain 55. Motion is imparted in turn to chain 55 by manipulation of control knob or hand wheel 56 acting through driving sprocket 57.

OPERATION

The operation of the apparatus in the production of animated films would generally proceed according to the following steps:

A. Adjust the height and angle of table 1 so that from sitting position 7 there is an unobstructed view of glass 38 beneath the lower guide rail 16. This is also to allow for maximum ease of manipulation and increased perspective over art work.

B. Adjust camera support carriage 15 so that:
 1. It is perpendicular to table 1 (as described above).
 2. The center of the field of view of the camera is aligned with the center of glass 38 when said glass is stationed directly above light box 39 shown in FIG. 1.
 3. The field of view of the camera when brought to its uppermost position within carriage 15 is still barely within the perimeter of glass 38. A lens of appropriate focal length will have to be employed in order to accomplish this.

C. Load the camera with suitable film.

D. Turn on lamps 40. Heating elements 42 may also be employed until glass 38 has reached an appropriate temperature as mentioned above.

E. Turn off all other lights and otherwise eliminate all sources of light. This may be accomplished by covering the framework of the apparatus with a drapery material or other suitable means.

F. When the glass 38 is hot enough the grease medium will flow readily onto the glass and can be brushed or smeared with ease. Begin applying the grease medium with the grease pencils or brushes. If colored grease pencils are being used, they may be applied in general areas of color and then brushed or otherwise manipulated to create a specific image. Of course, the image may be created entirely by application of the medium directly with the grease pencils.

G. Place a light meter just below the camera, take a light level reading, and adjust the camera for an appropriate exposure.

H. By use of control knobs 24, 33, and 56, arrange the field of view of the camera to encompass that portion of the image which will be the first frame of the film.

I. Utilize foot control system 44 to make or more exposures of this image.

J. Horizontal, vertical, and zoom movements, or any combination of these, can now be accomplished by the appropriate manipulation of control knobs 24, 33, and 56 in this manner:
 1. Divide the desired distance of the movement by the total number of frames occupying the desired duration of the movement. There are normally 24 frames per second. This will provide the distance of the incremental adjustments required for each successive exposure.
 2. Adjust the appropriate control knob or knobs exactly to this calculated distance, and make another exposure.
 3. Repeat the above step until the end of the movement is achieved.
 4. When making large adjustments of control knob 56 to effect zoom movement, it may be necessary to readjust the focus of the lens.

K. In addition to the mechanical movements described above, dynamic motion of the image can be accomplished. The procedure, as with the mechanical movements, is to make an incremental change according to the degree or rate of the desired gross change. This is often a rather subjective matter, but the procedure is always the same: make a small change and take a picture, then make another small change and take another picture, etc., until the desired gross change is accomplished. These changes in the image can be made in various ways:
 1. Rearrangement of the medium.
  a. By using standard paint brushes, either subtle or gross changes in the image can be made.
  b. By dabbing with a blotting material, such as cotton or cloth, generalized changes can be made.
 2. Removal of the medium.
  a. Large areas of the image may be wiped away with a rag or towel.
  b. Small areas may be removed by using a blunt scriber wrapped with cloth. This will provide a fine edge for distinct color separation.
  c. Even finer hairlike areas may be removed with a sharper scriber.
 3. Application of the medium.
  a. Direct application of the medium can be made with the grease pencil. This can either be done over the existing image, or within an area that has been cleared by one of the above methods.
  b. In use, the brushes become loaded with the grease medium so that when such a loaded brush is brought into contact with the hot glass it deposits a layer of the medium. Thus areas that have been wiped clear can be repainted by application of such a loaded brush. In order to clean such a loaded brush for use with another color, simply dissolve the lodged medium with mineral spirits and wipe the brush clean with a rag.
  c. Gross textural effects may be added by dabbing a wad of cotton or cloth that has been saturated with the medium upon the cleared area.

L. Should the operator desire to stop in mid-production, he can turn off the lights and the assembly will cool down to the point that the medium is no longer fluid, thus protecting the image from accidental rearrangement. To begin again he need only turn the light back on and wait for the medium to become fluid again. This facility also enables prepared templates, etc., to be placed over the image when it is cool to check out the registration of the image in conformation with some other material.

M. Whenever the movements controlled by knobs 24, 33, and 56 are not in effect, they should be locked into position by the respective use of locking bolt 26, sliding block 35 with wing nut 37, and clamps 51 with wing nut 52.

N. The foregoing describes a typical operation of the apparatus. Many other techniques, such as sandwiching the medium between glass and then moving the uppermost glass, introducing other types of materials upon the image to create collage effects, providing multiple layers of glass with pigment, and using overhead lighting in addition to, or instead of, the normal lights, may be employed to create diverse effects. All of the above should now be evident to those skilled in the art.

EXAMPLE

Figure 4:
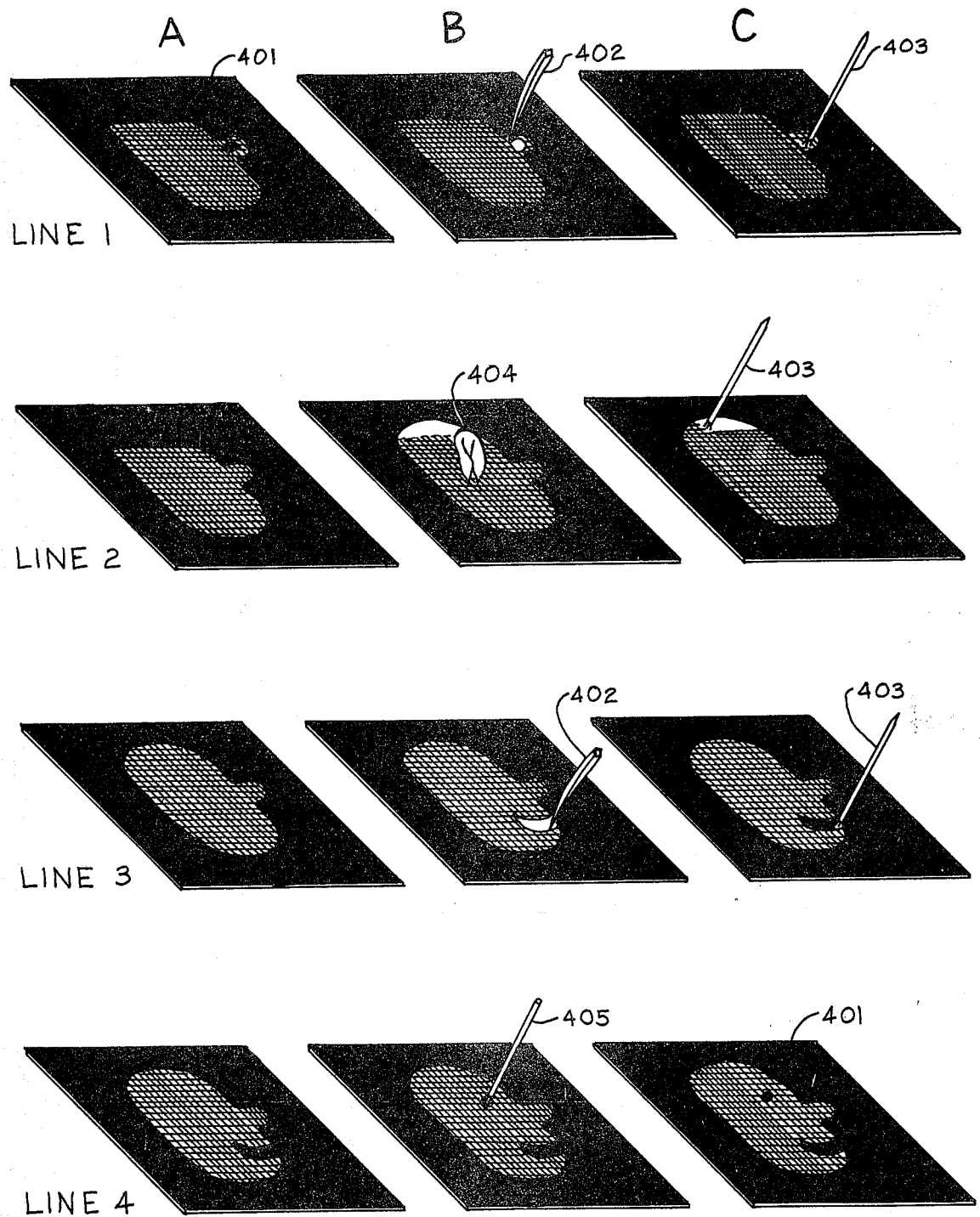
FIG. 4 is an illustrative example of how my invention works in a simple case.

A better understanding of the operation of my invention may be had from the illustrative example shown on FIG. 4 to which reference should now be had. The illustration shows the animated transition from a teacup to the profile of a person's face.

On each of lines 1, 2, 3 and 4 are shown basic steps namely, A, B, and C, for altering the image in preparation for photographing. The images in column A lines 1, 2, 3 and 4, as well as image 4-C are the ones actually photographed. The images in columns B and C represent successive steps in forming of the images to be photographed as described below.

Commencing with 1-A there is seen a teacup fully rendered on an opal glass plate 401 described above, using a grease medium, also as described above. Any desired number of exposures of this are made with my camera device, depending upon how long we want the image to remain on the screen.

At this point, plate 401 has been brought to the desired temperature as set forth under "Operation" above. By means of a scriber 402 shown at 1-B, I remove the dark background from the ring handle. At 1-C using a brush, I paint in the area just removed leaving the image shown at 2-A. One or more photographs of this are made.

At 2-B, using a piece of cloth 404, I remove some more of the background area and paint in with brush 403, using a different color if desired, as shown in 2-C. I thus obtain the image 3-A which again may be photographed with as many exposures as desired.

Again using scriber 402 as shown in 3-B, I remove a portion of the image and then fill in with background color using brush 403 again, as shown in 3-C. I thus obtain the image shown in 4-A which again may be photographed with as many exposures as desired.

Using a grease pencil 405 I form an eye of the image of the face which is shown completed at 4-C. This is finally also photographed as previously described here.

As a practical matter the sequence described here would appear quite jerky on film since there is considerable disparity between the images reproduced. I did this intentionally for the purpose of merely illustrating my method. In practice a considerably greater number of images would be used. This is well known to those skilled in the art of producing animated films.

I claim:

1. A process for producing animated films by drawing comprising the steps:
    directing a source of heat to the under surface of a translucent glass plate thereby heating said plate to a predetermined temperature;
    drawing an image upon the upper surface of said plate by means of a medium which remains fluid at said temperature;
    manipulating the flow of said fluid medium to create successive alterations in said image so as to effect a series of consecutive stages in an animated sequence;
    successively photographing said image initially and during said subsequent consecutive stages;
    thereby creating an animated film.

2. The process of claim 1 in which said heat source comprises also a source of light.

3. The process of claim 1 in which said medium comprises a grease pencil and said predetermined temperature is approximately 170° Fahrenheit.

4. An apparatus for producing animated films by drawing comprising:
    a translucent glass plate;
    a heat source positioned in spaced relation to the under side of said glass plate whereby said plate may be heated to a predetermined temperature;
    means for drawing an image upon the upper surface of said plate,
    said means having the property of remaining fluid at said temperature;
    means for manipulating the flow of said fluid medium to create successive alterations in said image and effect a series of consecutive stages in an animated sequence;
    means for successively photographing said image initially and during said consecutive stages.

5. The apparatus of claim 4 in which said heat source comprises also a source of light.

6. The apparatus of claim 4 including means for varying the intensity of said heat source.

7. An apparatus for producing animated films by drawing comprising:
    an adjustable work table;
    a camera positioned in adjustable spaced relation above said work table;
    an easel frame positioned upon said work table;
    a translucent glass plate positioned in an opening through said easel frame;
    a combined heat and light source positioned beneath said easel frame;
    means for operating said camera,
    whereby images drawn upon said glass plate with a medium having a low melting point may be manipulated to create successive alterations in said image and photographed consecutively;
    means for synchronizing said operation of said camera with said alterations in said image to produce an animated film.

8. The apparatus of claim 7 including means for varying the inclination of said work table at predetermined angles to the horizontal.

9. The apparatus of claim 7 including means for adjusting the position of said easel in a left and right direction and means for adjusting the position of said easel in a forward and backward direction.

10. The apparatus of claim 7 including means for adjusting the position of said camera with respect to said easel.

* * * * *